(12) United States Patent
Malan et al.

(10) Patent No.: US 8,001,271 B1
(45) Date of Patent: Aug. 16, 2011

(54) METHOD AND APPARATUS FOR LOCATING NAMING DISCREPANCIES

(75) Inventors: Gerald R. Malan, Ann Arbor, MI (US); Robert Stone, Ann Arbor, MI (US)

(73) Assignee: Arbor Networks, Inc., Chelmsford, MA (US)

(*) Notice: Subject to any disclaimer, the term of this patent is extended or adjusted under 35 U.S.C. 154(b) by 1158 days.

(21) Appl. No.: 10/689,559

(22) Filed: Oct. 20, 2003

Related U.S. Application Data

(60) Provisional application No. 60/419,942, filed on Oct. 21, 2002.

(51) Int. Cl.
*G06F 15/16* (2006.01)
(52) U.S. Cl. .................................................. 709/245
(58) Field of Classification Search .................. 709/245
See application file for complete search history.

(56) References Cited

U.S. PATENT DOCUMENTS

| | | | |
|---|---|---|---|
| 5,805,820 A * | 9/1998 | Bellovin et al. | 709/225 |
| 6,532,217 B1 * | 3/2003 | Alkhatib et al. | 370/252 |
| 2002/0178383 A1 * | 11/2002 | Hrabik et al. | 713/201 |
| 2003/0028650 A1 * | 2/2003 | Chen et al. | 709/229 |
| 2003/0070096 A1 * | 4/2003 | Pazi et al. | 713/201 |
| 2003/0093523 A1 * | 5/2003 | Cranor et al. | 709/225 |
| 2004/0024823 A1 * | 2/2004 | Del Monte | 709/206 |

OTHER PUBLICATIONS

DNS and BIND, by Paul Albitz & Cricket Liu, Published by O'Reilly & Associates, Inc. 1992, ISBN 1-56592-010-4, Chapter 2, p. 28 and Chapter 10.*
Cheung et al., "A formal-specification based approach for protecting the domain name system", Dependable Systems and Networks, 2000. DSN 2000. Proceedings International Conference on Jun. 25-28, 2000 pp. 641-651.*
Hastings et al., "TCP/IP spoofing fundamentals", Computers and Communications, 1996., Conference Proceedings of the 1996 IEEE Fifteenth Annual International Phoenix Conference on Mar. 27-29, 1996 pp. 218-224.*
Albitz et all., "DNS and BIND", Published by O'Reilly & Associates, Inc. 1992, ISBN 1-56592-010-4, Chapter 2, p. 28 and Chapter 10.*
Albitz et al., "DNS and BIND", Published by O'Reilly & Associates, Inc. 1992, ISBN 1-56592-010-4, Chapter 2, p. 28 and Chapter 10.*
Paul Albitz and Cricket Liu, "Chapter 2: How Does DNS Work?" *DNS and BIND in a Nutshell*, 1992, pp. v-xiii (Table of Contents) & pp. 13-39, O'Reilly & Associates, Inc., Sebastopol, CA, USA.

* cited by examiner

*Primary Examiner* — Vivek Srivastava
*Assistant Examiner* — William J Goodchild
(74) *Attorney, Agent, or Firm* — Lando & Anastasi, LLP

(57) ABSTRACT

A system is provided that polls one or more caching nameservers and compares their results to a trusted or standard set of data. The set of data may be, for example, stored in a computer system or distributed among several computer systems. In one aspect, the system comprises a discrepancy detector that detects discrepancies between one or more copies of mapping information. Mapping information may be, for example, mapping stored on a Domain Name System (DNS).

12 Claims, 10 Drawing Sheets

METHOD AND APPARATUS FOR LOCATING NAMING DISCREPANCIES

RELATED APPLICATIONS

This application claims priority under 35 U.S.C. §119(e) to U.S. Provisional Application Ser. No. 60/419,942, entitled "METHOD AND APPARATUS FOR LOCATING NAMING DISCREPANCIES," filed on Oct. 21, 2002, which is herein incorporated by reference in its entirety.

BACKGROUND OF THE INVENTION

End users of network systems, for example, the Internet, are accustomed to addressing resources and devices with names (e.g., www.arbornetworks.com). Names associated with these resources and devices are mapped to network addresses (e.g., IP addresses) which generally have a numeric format. For example, IP addresses have a numeric format of four octets separated by decimals or 8 half-words (16-bit units) separated by colons.

The Domain Name System (DNS) provides a method for mapping and resolving names into IP addresses so that an end user, addressing a device or resource by name, can connect to the appropriate device or resource. DNS is most commonly used in the Internet for associating names to addresses. DNS is well-known and is more thoroughly described in the book entitled DNS and Bind in a Nutshell, by P. Albitz and C. Liu, O'Reilly and Associates, Sebastopol, Calif., 1992, the contents of which are incorporated herein by reference.

The relationship between a name and its corresponding address is often referred to as a mapping and is related in the DNS system by a database entry referred to as a resource record. In particular, resource records that map addresses to names are referred to as address records. A collection of address records is held in DNS databases on systems referred to as nameservers. Nameservers "serve" name to address mappings to clients (e.g., client systems, other nameservers, etc.) in response to requests. Nameservers also serve other information, such as reserve lookup information, information regarding mail routing, etc.

The DNS system is a distributed system having a number of types of nameservers that perform various functions. For example, primary nameservers store authoritative mappings for their domains and provide the ability to make administrative changes to these mappings. Secondary nameservers have copies of the authoritative data from the primary nameservers and provide redundant resolving services to clients for the purposes of performance and failure considerations. Caching servers hold DNS records for mappings they have recently resolved. Primary and secondary nameservers are considered caching nameservers for mapping information of addresses in domains for which they are not authoritative.

There also exist "caching only" nameservers that are non-authoritative for any domain, but are used to cache domain information for performance considerations. According to recent statistics, over 80% of the nameservers in the Internet are caching-only nameservers.

When an end user wants to reach a resource or device using a name, a program executing on the client referred to as a resolver queries his network's nameserver for the address that corresponds to the name. The query may be served from an authoritative source (e.g., primary nameserver) or any one of a number of non-authoritative sources (e.g., caching-only nameserver or other server that caches mapping information).

SUMMARY OF THE INVENTION

Aspects of the present invention relate to determining naming discrepancies in a distributed naming system such as, for example, the Domain Name System (DNS).

Currently, an attacker may be able to "poison" the DNS database on one or more caching nameservers by providing bad address data to these caching servers. This type of poisoning is commonly referred to in the art as cache poisoning or DNS spoofing. This occurs because there are thousands of nameservers which cache information about any domain they are asked to resolve, and the method by which caching servers learn information permits widespread dissemination of bad data to other servers (e.g., primary, secondary, and caching-only nameservers). This poisoning generally occurs without the knowledge of the administrators of the DNS domain being poisoned. Also, if a caching nameserver has its cache altered, the affected domain owner is not made aware of this since there is no feedback mechanism in DNS between the caching nameservers and the administrator of the domain being poisoned, and therefore there are difficulties in detecting such an attack.

Typically this problem is addressed by making the nameservers less susceptible to this type of attack, e.g., by applying security patches to caching nameservers that prohibit the caching server to be poisoned in this manner. However, it is not possible to apply patches to nameservers which one does not control. That is, mapping information for a domain poisoned by an attacker is distributed among nameservers that an administrator for the poisoned domain has no control (e.g., caching-only nameservers that cache other domain's data). Therefore, the problem of poisoning caching nameservers cannot be effectively controlled by an administrator.

Even with the latest DNS server patches, it is still possible for incorrect mapping information of a nameserver to produce a deleterious effect. For example, an authorized administrator could mistakenly enter an incorrect mapping in a primary nameserver for his domain, and this incorrect mapping would propagate the incorrect mapping to other nameservers. Therefore, there is a need to efficiently monitor and detect problems associated with incorrect mapping information.

As noted above, in a distributed system there are often several copies of the same information located throughout the system. It is advantageous for the owner or creator of the information to verify that the various copies of the information match an authoritative version of the information. With regard to the Internet, for example, a corporation or individual desires to insure that the various copies of DNS records related to its resources (e.g., web sites, e-mail addresses, file servers, etc.) are accurate so that potential clients and agents of the corporation may utilize the resources. An inaccuracy in a distributed copy of the information may result in lost business or efficiency for the corporation or individual.

In one aspect of the invention, a system is provided that polls one or more caching nameservers and compares their results to a trusted or standard set of data. This set of data may be, for example, stored in a computer system or distributed among several computer systems.

Although various aspects of the invention are described below in terms of the DNS, it will be readily appreciated by those skilled in the art that the concepts disclosed herein may be used in any mapping system. In particular, various aspects of the invention may be used in systems in which names are mapped to resources or other entities (e.g., by other systems such as LDAP, NFS, etc.). Further, it will be appreciated by those of skill in the art that the methods and concepts described herein may be applied to any system in which non-authoritative copies of authoritative information are distributed. The invention should not be considered to be limited to the particular examples described below with respect to the DNS system.

According to one aspect of the present invention, a method is provided for locating a discrepancy in mapping information that maps an identifier to a particular resource. The method comprises acts of determining a first mapping, determining a second mapping, and comparing the first mapping to the second mapping and identifying at least one discrepancy between the first and second mapping. According to one embodiment of the present invention, the act of determining a second mapping comprises acts of querying a nameserver and receiving a response from the nameserver, the response containing the second mapping. According to another embodiment, the act of determining a first mapping comprises an act of obtaining an authoritative mapping from an authoritative source. According to another embodiment, the authoritative source is at least one of an authoritative nameserver, and a database storing a plurality of authoritative mappings.

According to another embodiment, the method further comprises an act of reporting the at least one discrepancy to a user. According to another embodiment, the first mapping is a first namespace mapping that maps a first name to a first resource and the second mapping is a second namespace mapping that maps a second name to a second resource. According to another embodiment, the first namespace mapping is stored on an authoritative nameserver and the act of determining a first mapping comprises an act of obtaining the first mapping from the authoritative nameserver. According to another embodiment, the act of determining a second mapping comprises acts of querying a nameserver and receiving a response from the nameserver, the response containing the second mapping.

According to another embodiment, the method further comprises an act of compiling a list of nameservers to be queried. According to one embodiment, the act of querying a nameserver comprises an act of requesting at least one namespace mapping record from the nameserver. According to another embodiment, the act of compiling a list of at least one nameserver comprises acts of sending a namespace mapping resolution query to a plurality of network nodes, waiting for one or more responses from the plurality of network nodes; and determining whether a network node in the plurality of network nodes is a nameserver. According to another embodiment, the act of determining comprises an act of determining whether the network node in the plurality of network nodes is a nameserver based on a format of one or more responses received from the network node. According to another embodiment, the act of determining comprises an act of determining that a network node in the plurality of nodes is not a nameserver if the network node does not respond to the namespace mapping resolution query. According to another embodiment, the act of compiling a list of at least one nameserver comprises an act of listening for a request from a non-authoritative nameserver to an authoritative nameserver, and when the request is detected, adding the non-authoritative nameserver to a list of nameservers. According to another embodiment, the request is a resolve request.

According to another aspect of the present invention, a method is provided for discovering nameservers, comprising acts of sending a namespace mapping resolution query to a plurality of network nodes, waiting for one or more responses from at least one of the network nodes, and determining whether a network node in the plurality of network nodes is a nameserver. According to one embodiment, the act of determining comprises an act of determining whether a network node in the plurality of network nodes is a nameserver based on a format of the response from the network node. According to another embodiment, the act of determining comprises an act of determining that a network node in the plurality of nodes is not a nameserver if the network node does not respond to the namespace mapping resolution query.

According to another aspect of the present invention, a method is provided for discovering nameservers, comprising acts of listening for a request from a non-authoritative nameserver to an authoritative nameserver, and when the request is detected, adding the non-authoritative nameserver to a list of nameservers. According to one embodiment, the request is a resolve request.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears. All references cited herein are expressly incorporated by reference.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings.

DETAILED DESCRIPTION

Figure 1:
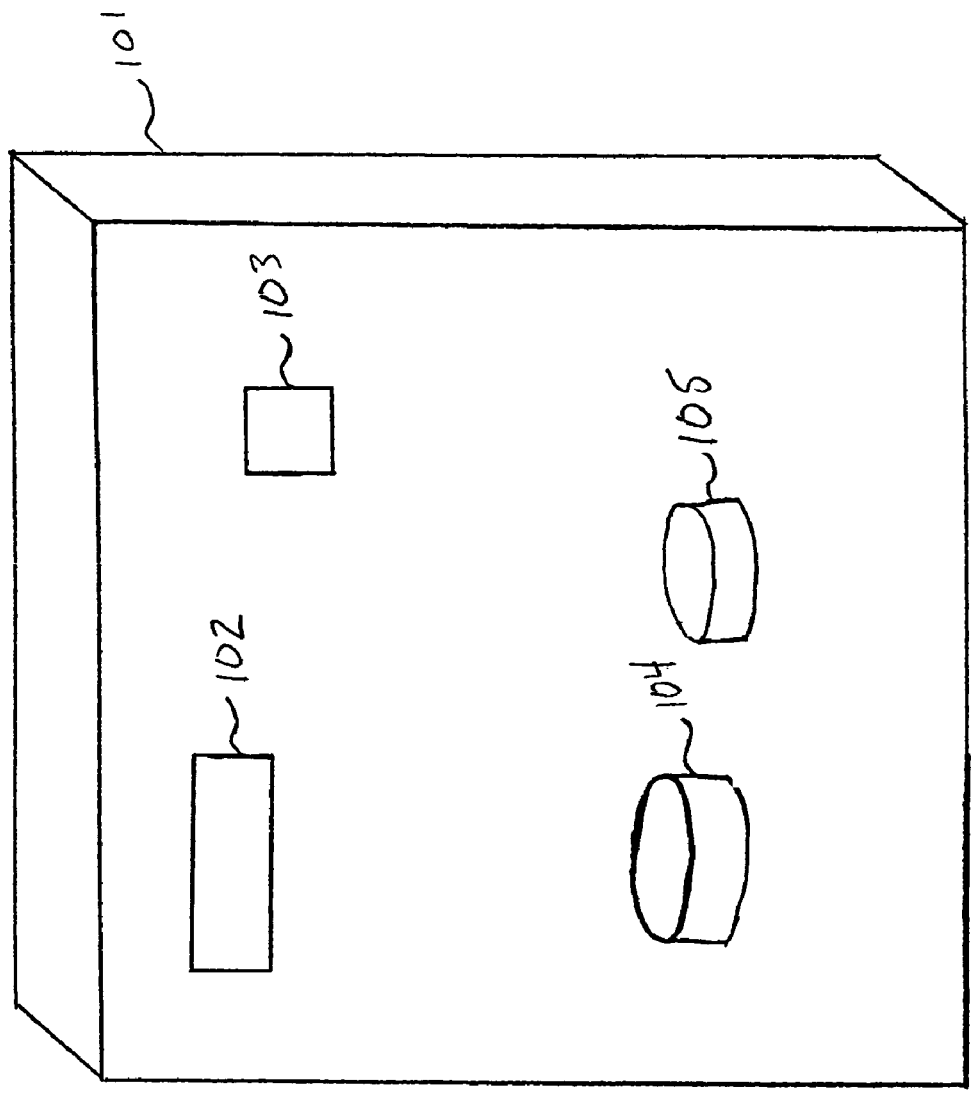
FIG. 1 shows a discrepancy detector in accordance with one embodiment of the present invention.

According to one aspect of the invention, the system comprises a discrepancy detector that detects discrepancies between one or more copies of information. A discrepancy detector 102 according to one embodiment of the invention is shown in FIG. 1. The discrepancy detector as specialized software executing in computer system 101 may be implemented in computer system 101 that may be, for example, a general purpose computer system. A processor of computer system 101 (not shown), for example, may sequentially execute instructions provided to it from an instruction memory (not shown). A logical group of instructions is commonly referred to in the art as a program, and these instructions executed by processor provide functionality to computer system 101. Computer system 101 may include input and output devices (not shown) by which data can be delivered to and displayed by processor. The processor may also perform one or more functions associated with discrepancy detector 102.

For example, computer system 101 may include one or more communication devices that connect computer system 101 to a communication network (not shown). For example, this interface may be a network interface by which the discrepancy detector can communicate with systems that store copies of information to be compared.

Computer system 101 stores a trusted or standard set of data 104 that serves as a basis for comparison with information received from other systems. As discussed, this trusted mapping may be stored by system 101 or may be obtained from another system. Computer system 101 is also configured to obtain a set 105 of information that includes, for example, a mapping stored in a nameserver. The mapping may be compared to the trusted mapping.

Once the trusted and mappings are available, elements of the mappings are compared, for example, by a processor of computer system 101. If the mappings are not identical, the discrepancy detector 102 may alert an owner of the information indicating the presence of a discrepancy. The alert may be, for example, an e-mail alert, SNMP trap, indication displayed on a management console (not shown), or other indication that a discrepancy has been found. The alert may be issued to a user through an interface 103 of computer system 101, for example.

It should be appreciated that computer system 101 may be any type of computer system, and the invention is not limited to any particular type. For example, system 101 may be a general purpose computer system that is programmable using a high level computer programming language. Computer system 101 may be also implemented using specially programmed, special purpose hardware. Computer system 101, generally includes a processor which is typically a commercially available processor such as the well-known Pentium class processors available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS system X available from Apple Computer, the Solaris Operating system available from Sun Microsystems, Unix available from various sources, or Linux available in both free and commercial distributions from various sources. Many other operating systems may be used.

Various embodiments of the present invention may be programmed using an object oriented programming language, such as SmallTalk, Java, C++, or C# (C Sharp). Other programming languages or combination of programming languages may also be used. Alternatively, functional, logical, or imperative programming languages may be used. It should be appreciated that one or more portions of the discrepancy detector may be distributed to one or more computers (not shown) coupled to a communications network. These computer systems may also be general purpose computer systems.

It should be understood that the invention is not limited to a particular computer system platform, processor, operating system, or network. Also it should be apparent to those skilled in the art that the present invention is not limited to a specific programming language or computer system and that other appropriate programming languages and other appropriate computer systems could also be used.

It should be appreciated that the mappings can be stored on system 101 in several formats, such as elements located in a database or may be stored in flat files. Also, mappings may be stored in different portions of the same physical memory or may be distributed across several memories or storage locations in several computer systems.

Figure 2:
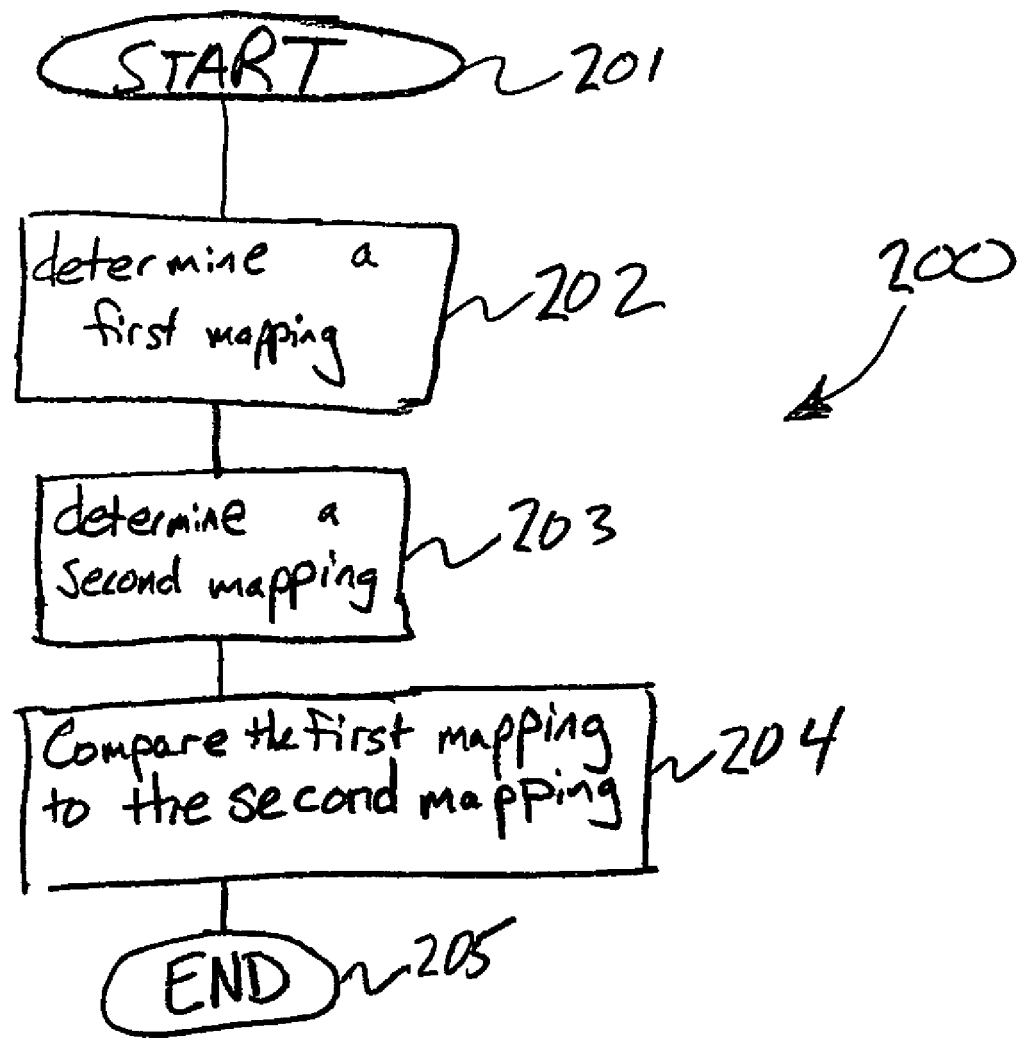
FIG. 2 shows a process for determining mapping discrepancies according to one embodiment of the invention.

FIG. 2 shows a method for determining mapping discrepancies according to one embodiment of the present invention. Process 200 may be executed, for example, by a general purpose computer configured to detect mapping discrepancies in accordance with various embodiments of the invention. Process 200 may be executed, for example, after an authoritative mapping has been updated, periodically in association with a detection process, or when a corporation or individual believes a distributed copy of the mapping has been corrupted, or in any other situation.

Process 200 begins at block 201. At block 202, a first mapping is determined by, for example, a general purpose computer 101 having a discrepancy detector (e.g., discrepancy detector 102). The computer may determine the first mapping, for example, by obtaining it from an authoritative source (e.g., an authoritative server or database which the computer is configured to query) or it may be manually entered in a database associated with the discrepancy detector.

Process 200 continues to block 203, in which the discrepancy detector determines a second mapping. The second mapping may be determined, for example, by retrieving the second mapping by issuing a request to obtain the mapping by a system or process. In the case of the DNS, the second mapping may be determined by sending an address resolution request to a caching system having the second mapping in question.

The first and second mappings may be a mapping (e.g., DNS resource record) between a name and a resource address, such as an IP address. The first mapping is generally the more authoritative or trusted mapping; the first mapping is, for example, a mapping entered by an agent of a corporation on its behalf (e.g., a network administrator), and the first mapping is the mapping from which the distributed copies should be created and with which the distributed copies should be consistent. The second mapping is typically a non-authoritative version of the first mapping. For example, in the case of DNS, the second mapping may be cached entry stored in a nameserver. The second mapping may be, for example, a copy of the first mapping created by a software process, or may be a copy manually entered by an administrator.

At block 204, the discrepancy detector compares the first and second mappings. This may be done by a simple character by character or field by field comparison, for example. If the comparison shows that the first and second mappings are not the same, then there is a discrepancy between the first and second mappings. A discrepancy between the first and second mappings is typically the result of, for example, the second mapping being improperly entered, out of date, or altered by a malicious entity. Discrepancies may be produced by any method, malicious or otherwise, and the invention is not limited to any method for creating a discrepancy.

A discrepancy detector according to one embodiment of the invention may record mappings received from other systems (e.g. nameservers) in a database. For example, for each nameserver, there may be an associated table of mappings stored by the detector.

Each entry of the table stores a mapping (e.g., a name to address mapping, alias to name mapping, etc.) for a mapping entry retrieved from the associated nameserver. Also, there may be tables storing mapping entries related to a particular domain. Further, historical changes of these mappings may also be tracked for the purpose of performing root cause analysis of an attack. For example, the discrepancy detector may record a discrepancy between the first and second mappings in a historical database, and may alert the owner of the first mapping or a third party organization of the discrepancy. The alert may be, for example, an e-mail alert, SNMP trap, indication displayed on a management console (not shown), or other indication that a discrepancy has been found. Process 200 ends at block 205.

Because mapping entries may be distributed to one or more systems, it may be desired to discover systems in which mapping entries may be stored. In the case of DNS, entries may be stored in one or more caching nameservers. According to another aspect of the invention a discovery system is provided that compiles a list of caching nameservers for the purpose of verifying their mappings.

As discussed above, locations of copies of mapping information associated with a domain may be distributed among many systems. According to one aspect of the invention, a discovery process may be performed that discovers locations of copies of information. Because copies of information may be made without the knowledge of the information owner, the owner may not be aware of how many copies of the information exist or where the copies are located. Furthermore, if a third party is verifying information without the assistance of the owner of the information (e.g., a discrepancy detection service to the owner), the third party may need to discover the locations of both authoritative and non-authoritative copies of the information.

According to one aspect of the invention, a detector is provided that performs a discovery for copies of information. The copies of information may be, for example, mapping information that relates names to addresses for a particular domain of interest. In the case of DNS, a detector may be provided that discovers one or more mappings (e.g., IP address to domain name, alias to domain name, etc.) related to a particular Internet domain (e.g., www.arbornetworks.com). Also, discovery can be performed periodically, and may be performed in connection with detecting discrepancies as described above. For example, a discovery for systems that store copies may be performed prior to detecting discrepancies.

Figure 3:
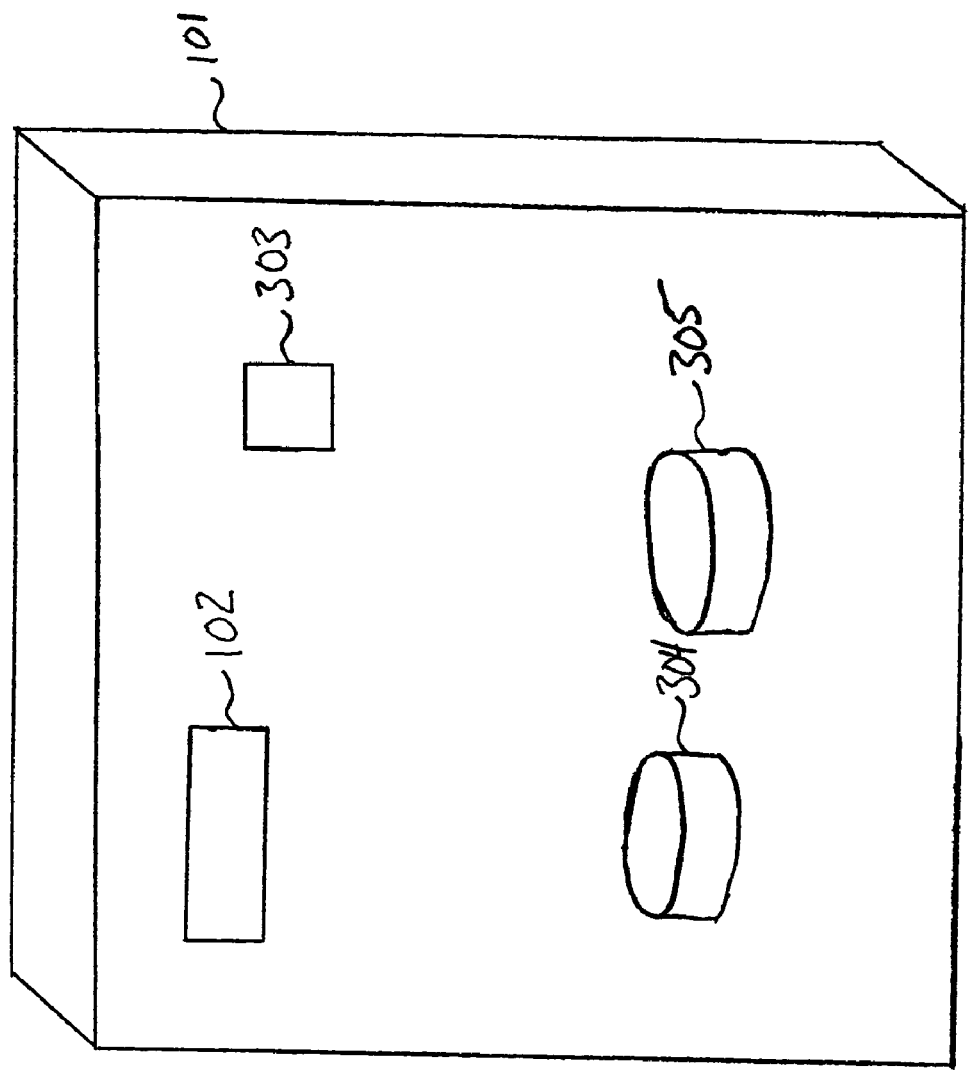
FIG. 3 shows an active discoverer according to one embodiment of the invention.

FIG. 3 shows an active discoverer according to one embodiment of the present invention that discovers locations of copies of mapping information. For example, the discoverer may discover, from one or more network nodes, which network nodes are nameservers possessing DNS records. Computer system 101 may communicate with, for example, other computer systems on a communications network to obtain mapping information stored on other systems. For example, namespace mapping queries and responses may be sent from and received by computer system 101 via a communication interface 303. Namespace mapping queries may be broadcast, multicast or unicast to network nodes, for example. In the case of the DNS, the discoverer may determine that a network node is a nameserver by examining a response to a query sent by the network node and identifying the response as a typical DNS response.

Database 304 stores a list of possible locations of copies of mapping information, for example, a list of network nodes. Database 304 may also include a list of possible locations that have already been queried to determine if they hold copies of mapping information. Database 305 stores a list of the possible locations of copies of information mapping that have been determined to be locations that hold copies of mapping information. In the case of DNS, database 305 may store a list of caching servers on the Internet that may possibly have stored an incorrect mapping. Further, may maintain the list periodically as changes to nameservers occur.

Figure 4:
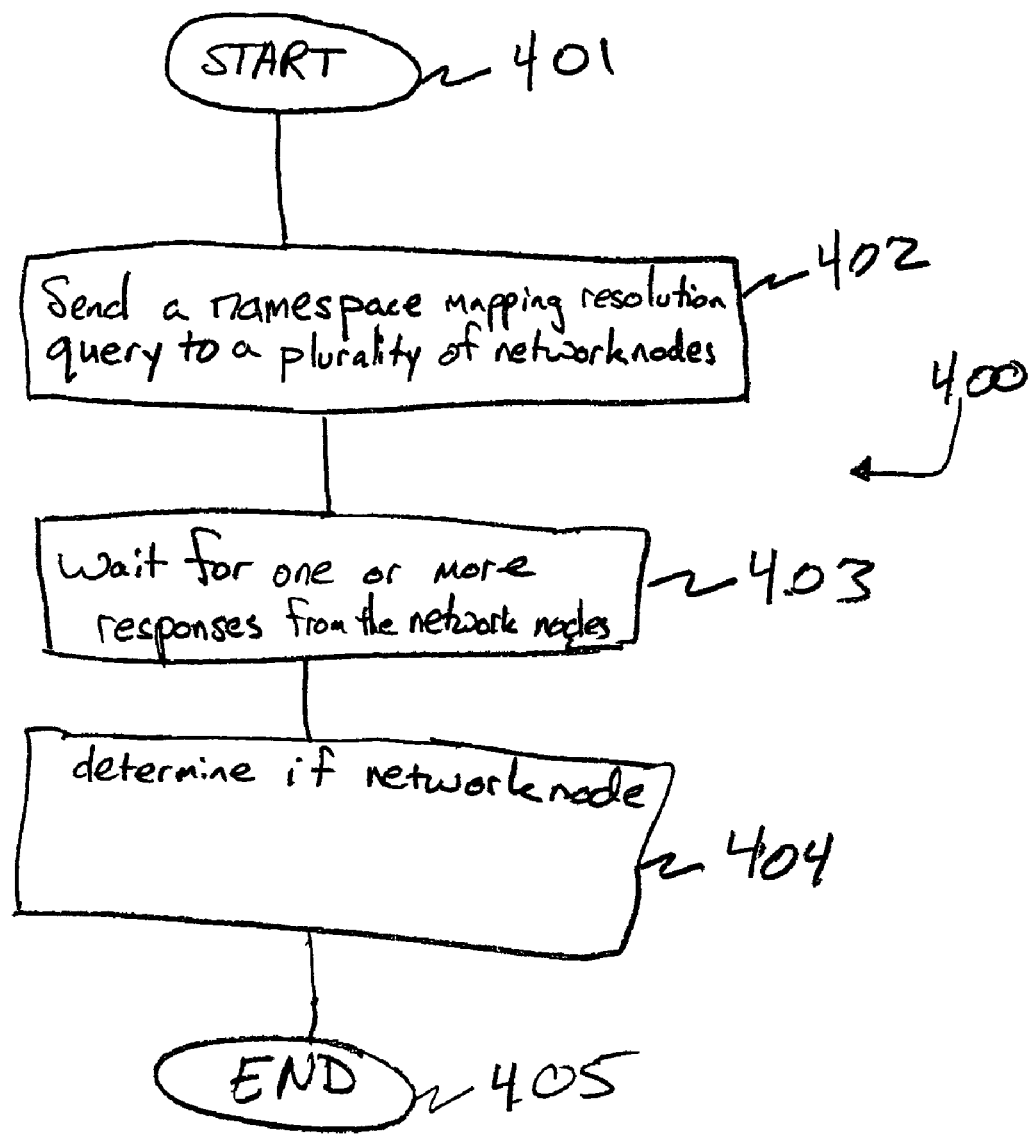
FIG. 4 shows a process for actively discovering a location of copies of mapping information according to one embodiment of the invention.

FIG. 4 shows a process according to one aspect of the invention for actively discovering the location of one or more devices that hold copies of mapping information. For example, process 400 may be used to discover DNS nameservers. Process 400 a discoverer may be executed, for example, by an active discoverer as discussed in reference to FIG. 3. The discoverer may also be part of the discrepancy detector or may be a separate software program or dedicated hardware, for example.

Process 400 begins at block 401. In block 402, the discoverer sends a namespace mapping resolution query to a plurality of network nodes (e.g., hosts, routing devices, file servers, nameservers, etc.). The query may take the form of a specialized message, and may be sent over one or more networks (e.g., wireless network, T1, Ethernet, or other type of communication network), for example. At block 403, the discoverer waits for one or more responses from the network nodes.

At block 404, the discoverer determines if a network node is a nameserver. The discoverer may determine if a network node in the plurality of network nodes is a nameserver based on the format of a response sent by the network node (e.g. by determining that the network node responded to a resolve request). Also, the discoverer may consider the absence of a response to be a response (i.e., by not responding, the discoverer may determine that the network node is not a nameserver). Process 400 ends at block 405.

Figure 5:
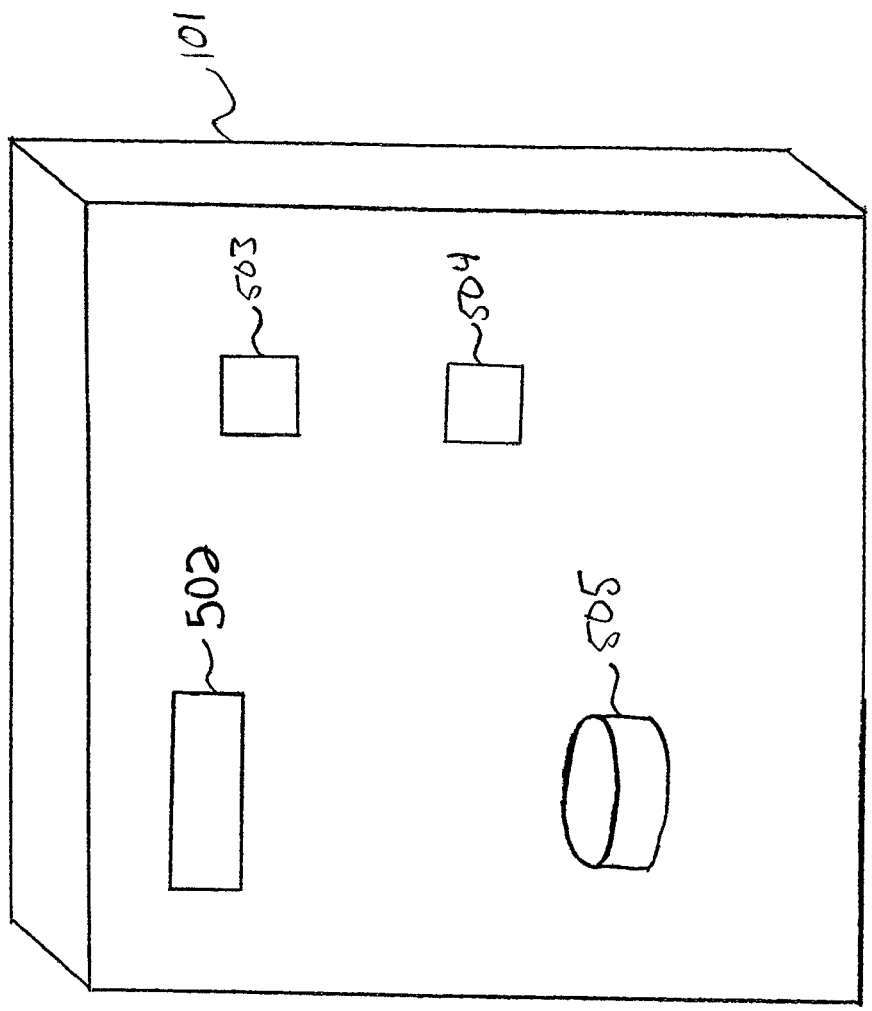
FIG. 5 shows a passive discoverer according to one embodiment of the invention.

FIG. 5 shows a passive discoverer 502 in accordance with one embodiment of the present invention. Database 505 holds a list of locations mapping of information that have been passively discovered by discoverer 502. Interface 503 provides an interface through which discoverer 502 receives data. Generally, interface 503 is a network interface that is adapted to receive network traffic (i.e., data, usually in the form of network frames, packets, cells, etc.). Interface 504 (e.g., a network interface) provides an interface through which data may be output from discoverer 502.

In one embodiment of the invention, passive discoverer 502 "sniffs" network traffic (e.g., packets, frames, cells, etc.) on interface 503. That is, the passive discoverer 502 examines data it receives on interface 503. Data may be examined, for example, regardless of the destination of the data and whether it is part of a unicast broadcast, point-to-point, or multicast communication. If the discoverer determines that the data is a namespace mapping resolution query, for example by the format of the data, the discoverer adds the sender of the data to a list of nameservers in memory 505.

In the case of DNS, the passive discoverer 502 may inspect traffic to determine namespace queries to authoritative nameservers. These queries to authoritative nameservers are generally performed by non-authoritative servers (e.g. caching servers) requesting resolution of mapping requests. According to one embodiment of the invention, passive discoverer 502 may be logically located (e.g. on the same network) near one or more authoritative nameservers so that a majority of namespace queries to the nameservers will be observed. Indeed, a number of passive discoverers may be located throughout the network.

In another embodiment of the invention, passive discoverer 502 receives traffic destined to a nameserver on interface 503, examines the traffic and forwards the traffic through interface 504 towards the nameserver. That is, discoverer 502 is part of the network infrastructure (e.g. router, firewall, etc.) that is capable of receiving, processing, and forwarding traffic. If the traffic is in the form of a namespace mapping resolution query, the discoverer adds the sender to a list of nameservers in database 505.

Figure 6:
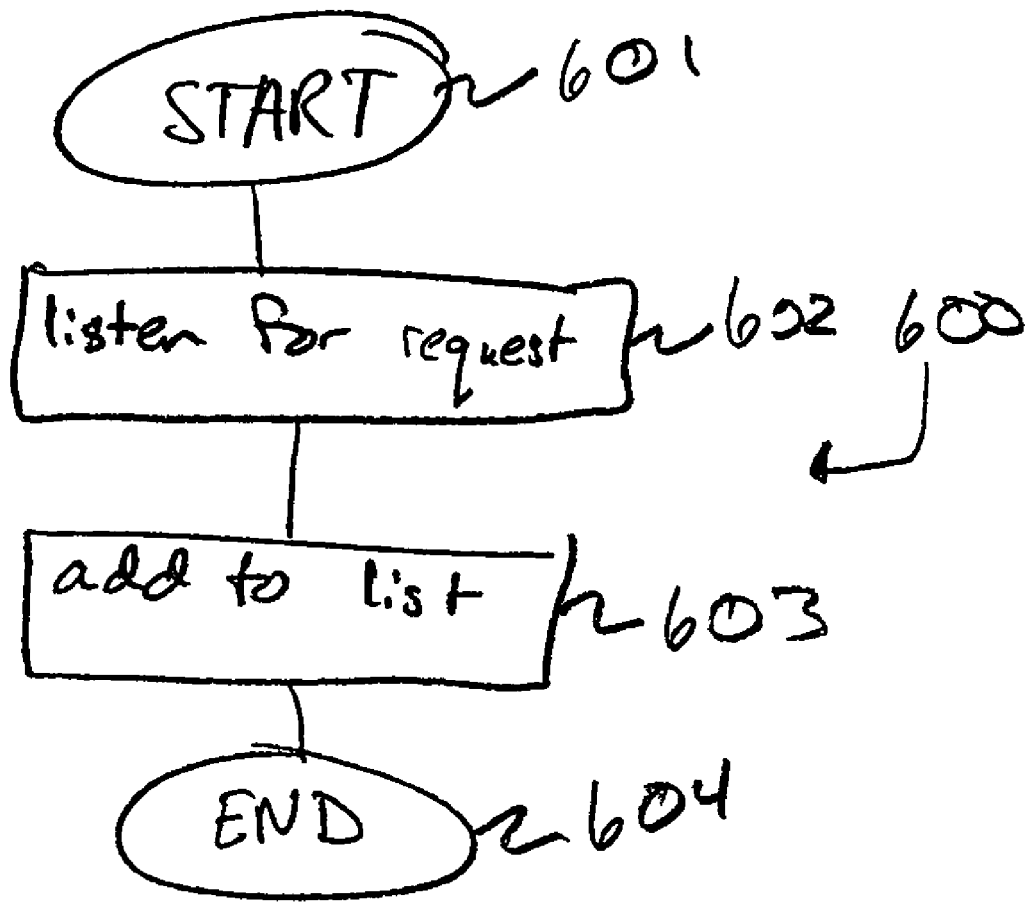
FIG. 6 shows a process for passively discovering a location of copies of mapping information according to one embodiment of the invention.

FIG. 6 shows a process 600 used to passively discover the location of copies of information according to another embodiment of the invention. Process 600 may be performed, for example, by a discoverer as discussed above with reference to FIG. 5 or any other hardware or software system. Process 600 begins at block 601. At block 602, the discoverer listens for request messages that request copies of data (e.g. a mapping request). The discoverer may do this, for example, by performing packet sniffing on a network and recognizing those packets that contain a request for a copy of data. In DNS, these requests may be resolution requests sent by non-authoritative servers to authoritative servers.

At block 603, the discoverer adds the source of the request to a list of locations having copies of information. According to one embodiment of the invention, the locations on the list may be used by a discrepancy detector as sources of mappings for performing process 200 described above with reference to FIG. 2. Process 600 ends at block 604.

It should be appreciated that the discrepancy detector and discoverers described herein may be implemented in many different ways. The discrepancy detector and discoverer may be implemented, for example, as software programs written in a computer programming language (e.g., C, Perl, C++, C#, Java, etc.) and executed on a general purpose or special purpose device or stored on a computer readable medium such as, for example, a volatile storage medium such as, for example, a memory device or non-volatile medium such as a DVD or magnetic disk. A discoverer and a discrepancy detector according to various embodiments of the invention may also be implemented in an embedded system or other specialized hardware installed in a general purpose or special purpose device.

It should be appreciated that, while discrepancy detectors and discoverers according to various embodiments of the invention have been discussed separately, they may be implemented in the same software program or hardware device.

As one skilled in the art can recognize from the above, various aspects of the invention have relevance with respect to detecting namespace mapping discrepancies in the domain name system (DNS), but the invention is not limited to any particular naming system.

In one embodiment of the invention, a set of one or more discrepancy detectors periodically polls large sets of both primary and caching nameservers for mapping information between well-known service points (e.g., domain names) and their associated IP addresses or other data (e.g., aliases, mail records, etc.). The one or more discrepancy detectors model the responses and compare them to sets of allowable mappings, taken, for example, from the primary nameserver, or manually entered into a database in one of the discrepancy detectors. When misuse or anomaly with the DNS information is uncovered, the system may alert administrators of the affected domains or a third party organization that provides detection services, for example.

Figure 7:
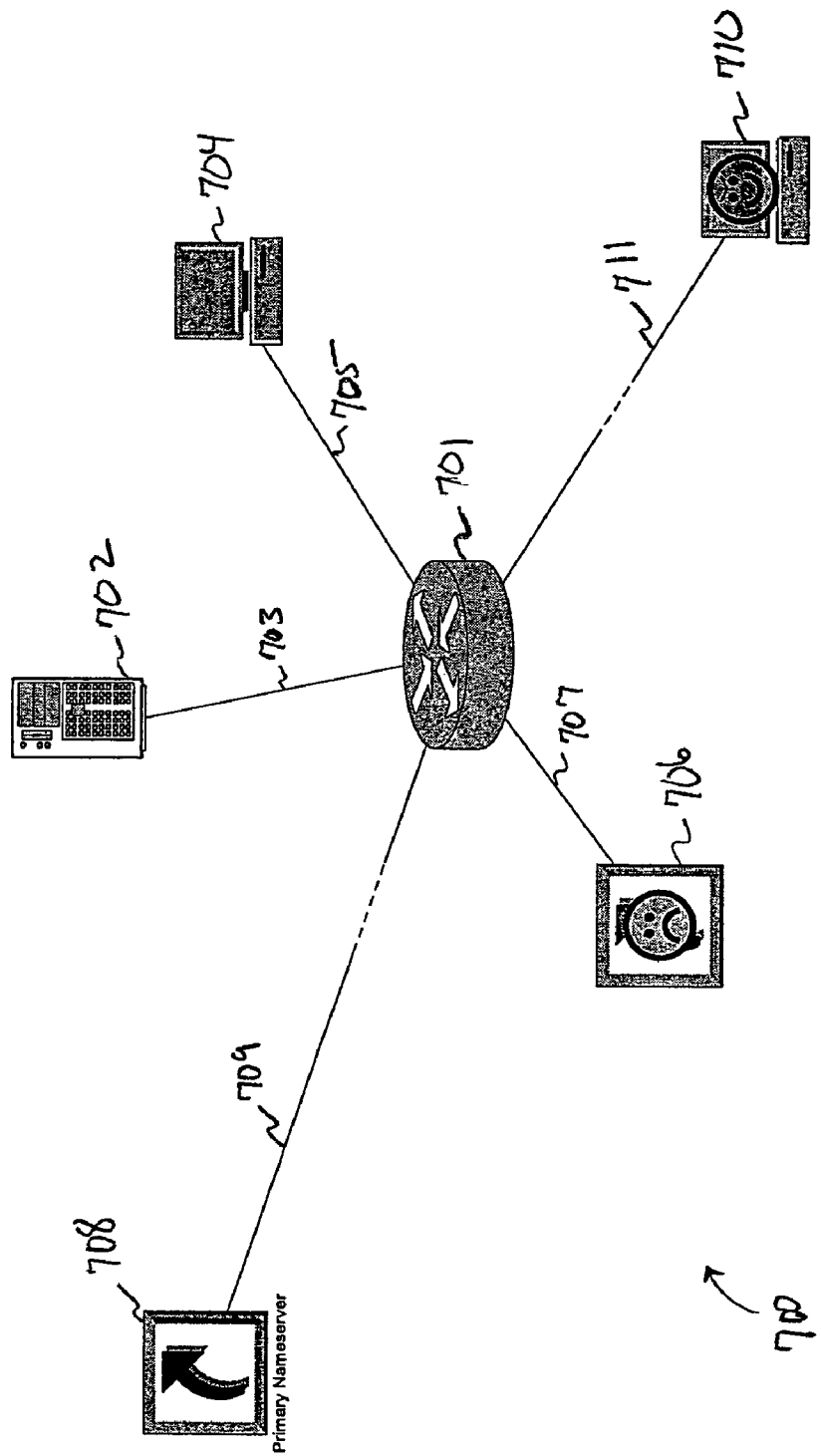
FIG. 7 shows an example environment in which various aspects of the present invention may be implemented.

FIG. 7 illustrates an example environment in which various embodiments of the invention may be employed. Several devices are connected to network device 701 by links, as shown. A link may be, for example, a wireless, T1, or cable connection, or some combination thereof. Server 702 is connected to network device 701 by link 703. Host device 704 is connected to network device 701 by link 705. Nameserver 706 is connected to network device 701 by link 707. Primary nameserver 708 is connected to network device 701 by link 709. There may be one or more devices, systems, etc. located between primary nameserver 708 and network device 701, as shown by the dashes in link 709. Malicious user 710 is connected to network device 701 by link 711. Typically, though not always, malicious user 710 is located outside of the network 700, as shown by the dashes in link 711.

Primary nameserver 708 holds authoritative data, for example, DNS namespace mappings, for network 700. Nameserver 706 may serve as an auxiliary nameserver (e.g. caching-only nameserver) to nameserver 708 in the network 700. Due to, for example, nameserver 706's logical proximity to server 702 and host device 704, server 702 and host device 704 may query nameserver 706 rather than primary nameserver 708.

Server 702, host device 704, and other systems and processes located both inside and outside of network 700 may be able to communicate with each other using names. As an example, host device 704 may refer to server 702 by name (e.g., domain name) when attempting to access it. If host device 704 does not have a mapping from the server 702's name to its logical address stored locally, host device 704 may query nameserver 706 for the mapping. If nameserver 706 possesses a mapping of the name of the server 702 to its logical address, it will return that mapping to host device 704. If the mapping is correct, host device 704 will be able to access server 702. If the mapping is not correct, host device 704 will not be able to access server 702, may receive an error message, access another resource entirely, or cause some other unpredictable event to occur.

As shown in FIG. 7, malicious user 710 has compromised in 706, for example, by poisoning nameserver 706's database of namespace mappings (e.g., domain name mappings). Malicious user 710 may poison nameserver 706's namespace mappings by DNS spoofing, for example.

In one such DNS spoofing attack, malicious user 710 configures his system to act like a nameserver for his own domain. Malicious user 710 then queries nameserver 706 about his own domain. In response to the query, nameserver 706 queries malicious user 710's system for the mapping related to malicious user 710's domain that it needs. Malicious user 710 then encapsulates, in his response to the query, a corrupt mapping relating to nameserver 706's domain. Nameserver 706 then caches the corrupt mapping in its database of namespace mappings. Malicious user 710 may use the poisoned database to gain unauthorized access to server 702, host device 704 and other devices in network 700, or may prevent systems in network 700 from communicating with each other and with systems of other networks. A compromise of nameserver 706 may go undetected until noticed by a network administrator, which may be a long period of time.

Figure 8:
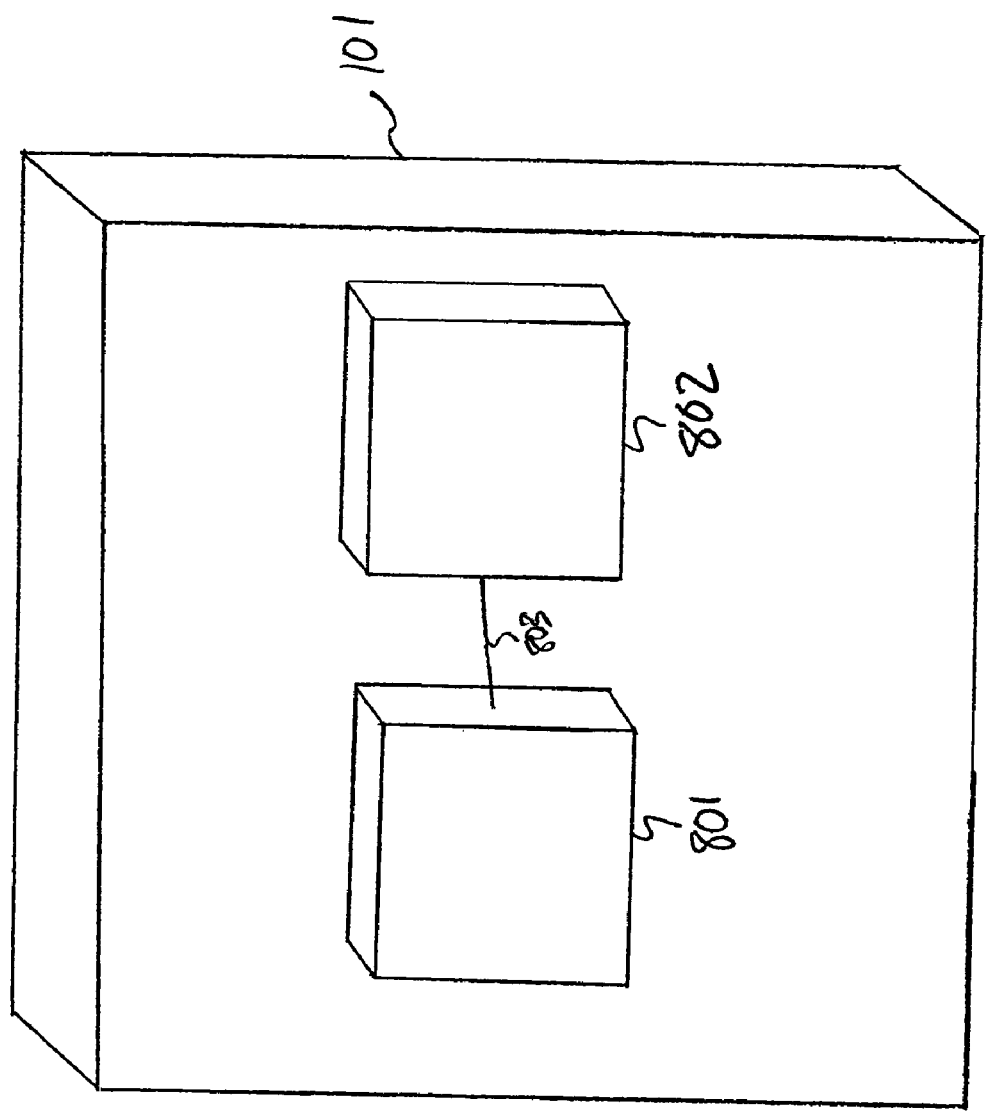
FIG. 8 shows another embodiment of a system that identifies naming discrepancies according to one embodiment of the invention.

FIG. 8 illustrates another system that identifies discrepancies according to one embodiment of the invention. The system shown in FIG. 8 comprises a discrepancy detector 801 and a discoverer 802, and may be implemented on a general purpose computer 101 described above. As such, the system shown in FIG. 8 may perform both discrepancy detection and discovery functions. The system shown in FIG. 8 may be attached to a communications network, for example, the Internet or a local area network, by a link (not shown). Discrepancy detector 801 and discoverer 802 may be able to share data by, for example, interprocess communication 803. Discoverer 802 may be able to perform the functions of one or both of the active discoverer and passive discoverer as described above. The system shown in FIG. 8 may be employed by a corporation or third party (e.g. as part of a mapping verification service) to discover locations of copies of information and verify their accuracy against an authoritative copy of the information.

Figure 9:
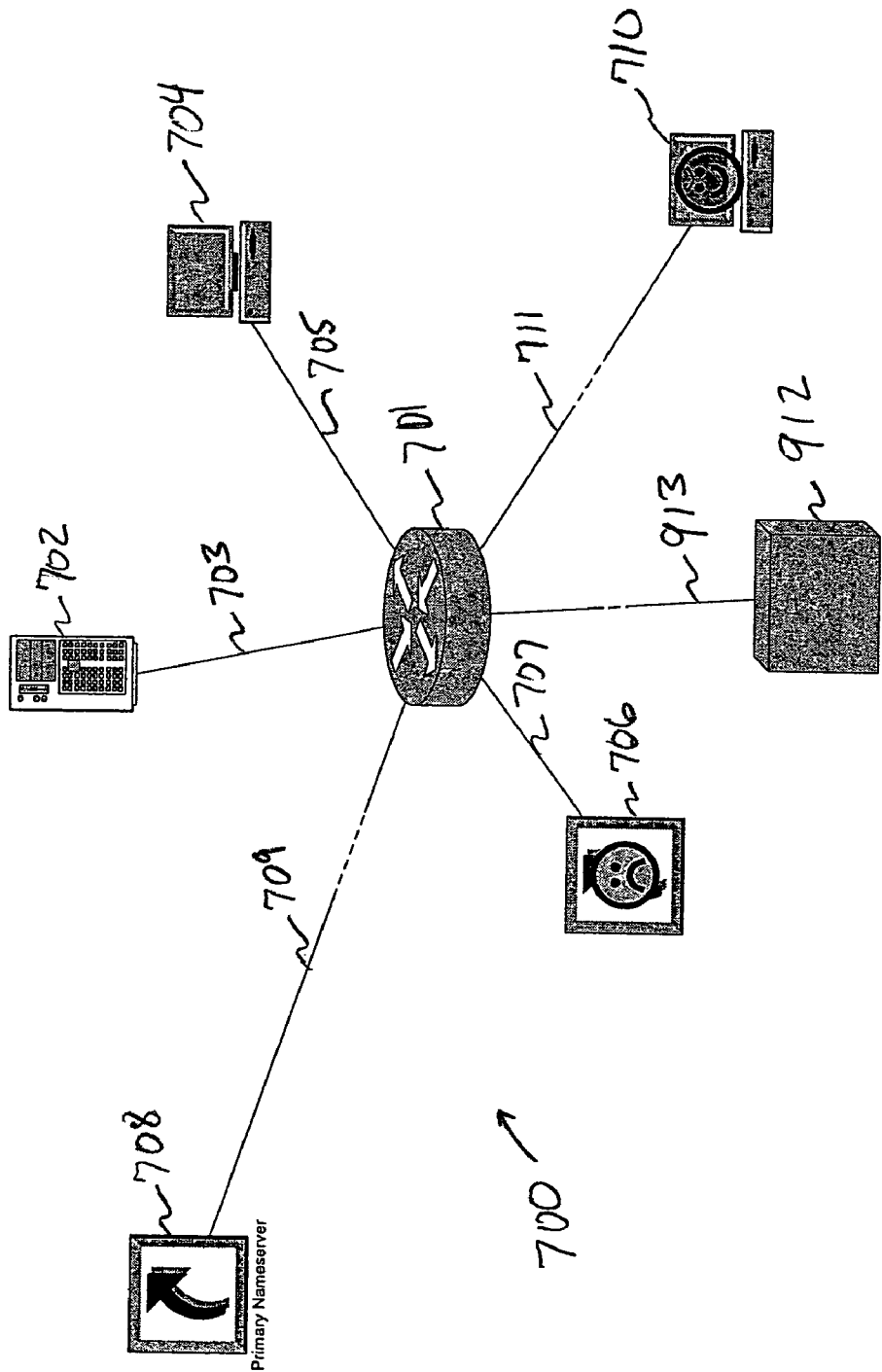
FIG. 9 shows a system that actively discovers nameservers and detects discrepancies according to one embodiment of the invention.

FIG. 9 shows a system 912 that both actively discovers nameservers and detects discrepancies according to one embodiment of the invention. System 912 is connected to network device 701 by link 913. System 912 may be located, for example, outside of network 700, as shown by the dashes in link 913. System 912, for example, performs the functions of both discrepancy detector and discoverer (e.g. similar to the system shown in FIG. 8) in accordance with one embodiment of the invention.

In the embodiment shown in FIG. 9, system 912 actively discovers nameservers. It may actively discover nameservers by sending a namespace mapping resolution query to multiple devices in network 700. In this scenario, system 912 waits for responses to the queries and then determines if a particular system or device is a nameserver from information communicated to or from that system or device. For example, system 912 may inspect a response sent by a device, and may compare the format of the particular device's response to a known format of namespace mapping resolution responses to determine if that device is servicing resolution queries.

It should be noted that some devices may not be configured to respond to namespace mapping resolution queries at all. In this situation, a device should be determined not to be a nameserver if it has not responded to a namespace mapping resolution query after a certain period of time. Therefore, in one aspect of the invention, the absence of a response from a particular device after a certain period of time is considered by the system 912 to be a response. That is, the particular device is considered by the system 912 not to be a nameserver if it does not send a response to a query within a certain period of time.

After system 912 has discovered both primary nameserver 708 and nameserver 706, it can obtain and compare namespace mappings from both nameservers. System 912 may obtain namespace mappings from nameservers 708 and 706 by accessing their respective databases or by requesting from them namespace mapping resolutions for one or more names, for example. System 912 may then, for example, alert either an administrator of network 700 or a third party of any discrepancy it discovers. System 912 may periodically perform one or more of the acts of discovering, obtaining, comparing and alerting as detailed above. System 912 may also perform one or more of the acts of discovering, obtaining, comparing and alerting as detailed above on a subset of mappings (e.g., important mappings) held by primary nameserver 708 and nameserver 706.

While the embodiment shown in FIG. 9 and described elsewhere herein is described as detecting a compromise of a nameserver, it will be appreciated that system 912 may detect discrepancies between other forms of data (e.g., CNAME alias mappings, mappings stored in flat files of host systems, etc.) and the invention is not limited to detecting any particular type of discrepancy located on any particular system. Also, system 912 can detect discrepancies that are the result of human or machine error.

Figure 10:
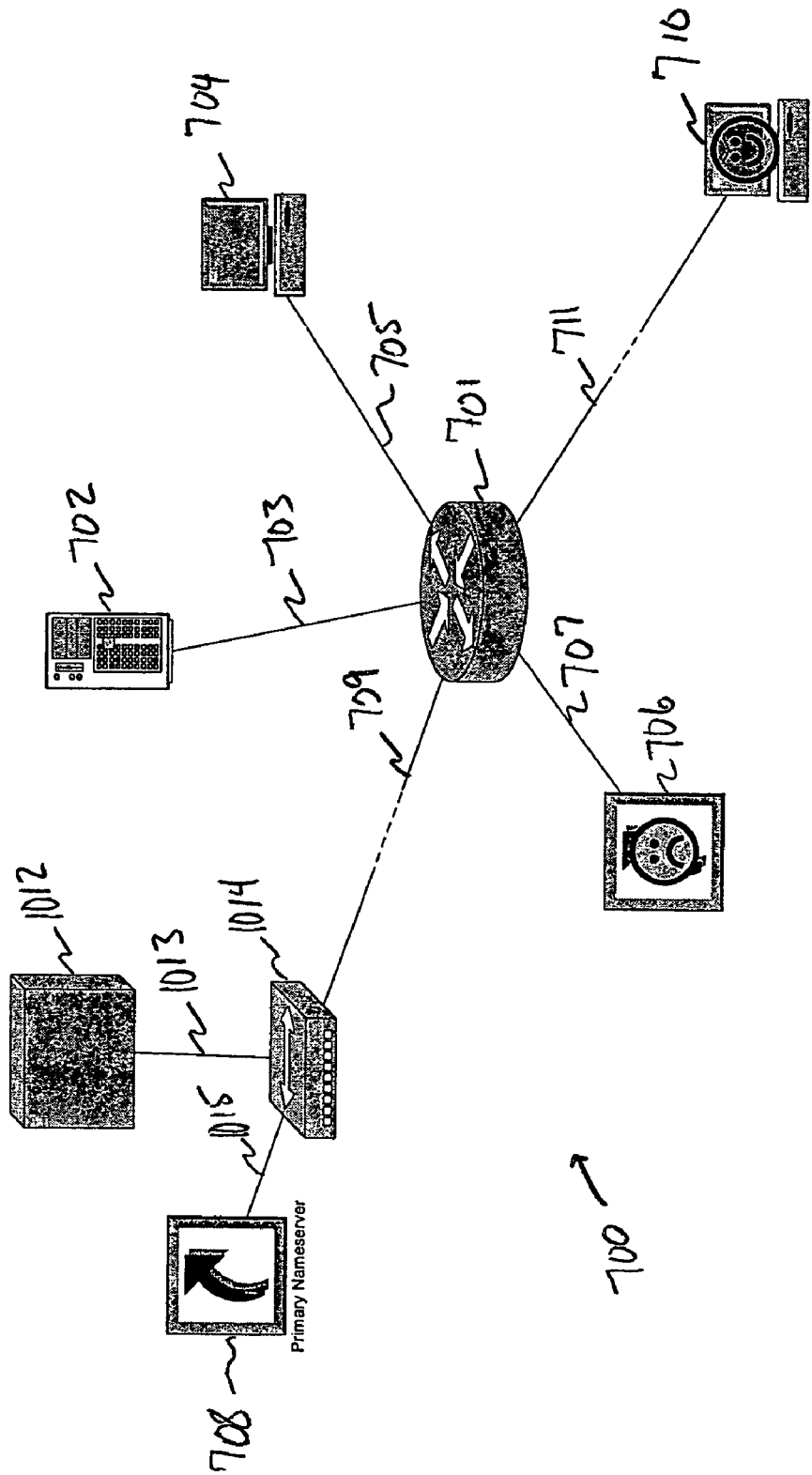
FIG. 10 shows a system that passively discovers nameservers and detects discrepancies according to one embodiment of the invention.

FIG. 10 shows a system for passively constructing a list of nameservers and detecting discrepancies according to another embodiment of the invention. Similar to system 912, system 1012 performs the functions of the discoverer and discrepancy detector as described above. System 1012 is connected to network device 1014, (e.g. a network hub, switch, etc.) by link 1013. Primary nameserver 708 is also connected to network device 1014 by link 1015.

In the embodiment shown in FIG. 10, system 1012 "listens" for data traffic bound for nameserver 708. In particular, system 1012 may examine the traffic for namespace mapping resolution queries directed to nameserver 708. System 1012 may, for example, determine that a message in the traffic is a namespace mapping resolution query based on a format of the message. When system 1012 detects a query from a nameserver or other resolver, system 1012 adds the querying nameserver or resolver to a list. Similar to the embodiment shown in FIG. 9, system 1012 obtains namespace mapping information from the nameservers it has discovered. In particular, system 1012 may then compare the namespace mapping information and alert an administrator of network 700 or a third party of any discrepancies it finds, for example.

It should be appreciated that the functionality of network device 1014 could be incorporated into system 1012, obviating the need for network device 1014 in network 700.

While the mechanisms in FIGS. 9 and 10 are described in relation to only two nameservers located in a single network, it should be appreciated that system 912, system 1012 and other embodiments in accordance with the invention may find discrepancies in information distributed across many nameservers located in a plurality of networks. Therefore, the invention should not be considered limited in this regard.

Also, systems 912 and 1012 may be implemented in special purpose hardware, such as controllers, or as software executable on general purpose or special purpose computers.

Furthermore, system 912, system 1012, and other embodiments of the invention may be capable of estimating the amount of the Internet that is affected by a discrepancy found between authoritative and non-authoritative copies of information. Systems 912 and 1012 may produce, for example, charts or lists of networks that are utilizing defective mapping information. The owner of the information may then gauge the urgency of updating or purging the mapping information based on the amount of the Internet using the bad mapping information.

System 912, system 1012 and other embodiments according to the invention may be deployed within a network to detect discrepancies between authoritative and non-authoritative copies of information. Alternatively, a third party organization could sell as a service to companies or individuals the functionality provided by system 912, system 1012 and other embodiments of the invention. The third party organization may monitor copies of information distributed across the Internet and other public or private networks. The third party organization may alert its clients when a discrepancy is detected, and may perform actions on its behalf (e.g., notify nameserver administrators that their nameserver is storing incorrect information and/or is susceptible to attack).

Having thus described several illustrative embodiments, various alterations, modifications and improvements will readily occur to those skilled in the art. Such alterations, modifications, and improvements are intended to be within the spirit and scope of the invention. Accordingly, the foregoing description is by way of example only and is not intended as limiting.

The invention claimed is:

1. In a distributed computer system, a method for locating a discrepancy in mapping information that maps an identifier to a particular resource in a domain naming system database, the method comprising acts of:

compiling a list of domain nameservers to be queried comprising acts of:
  sending a namespace mapping resolution query to a plurality of network nodes;
  waiting for one or more responses from the plurality of network nodes;
  determining whether a network node in the plurality of network nodes is a domain nameserver based on a format of one or more responses received from the network node; and
  if the network node is a domain nameserver, adding the network node to the list of domain nameservers to be queried;
determining a first mapping in a domain naming system, the act of determining the first mapping comprising an act of obtaining an authoritative mapping from an authoritative source of domain information in the domain naming system;
determining a second mapping in the domain naming system, the act of determining a second mapping comprising acts of querying a domain nameserver of the list of nameservers to be queried and receiving a response from the domain nameserver, the response containing the second mapping, wherein the first mapping is a first namespace mapping that maps a first name to a first resource and the second mapping is a second namespace mapping that maps a second name to a second resource, and wherein the domain nameserver is a non-authoritative source for the second mapping in the domain naming system;
comparing the first mapping to the second mapping and identifying at least one discrepancy between the first and second mapping; and
generating and sending an alert message to a user, the alert message indicating the at least one discrepancy between the first and second mapping.

2. The method of claim 1, wherein the act of compiling a list of at least one domain nameserver comprises an act of:
  listening for a request from a non-authoritative domain nameserver to an authoritative domain nameserver; and
  when the request is detected, adding the non-authoritative domain nameserver to a list of domain nameservers.

3. The method of claim 2, wherein the request is a resolve request.

4. The method of claim 1, wherein the authoritative source is at least one of:
  an authoritative domain nameserver; and
  a database storing a plurality of authoritative mappings in the domain naming system.

5. The method of claim 1, further comprising an act of reporting the at least one discrepancy to a user.

6. The method of claim 1, wherein the first namespace mapping is stored on an authoritative domain nameserver and the act of determining a first mapping comprises an act of obtaining the first mapping from the authoritative domain nameserver.

7. The method of claim 1, wherein the act of querying a domain nameserver comprises an act of requesting at least one namespace mapping record from the domain nameserver.

8. The method of claim 1, wherein the act of determining comprises an act of determining that a network node in the plurality of nodes is not a domain nameserver if the network node does not respond to the namespace mapping resolution query.

9. A method for discovering domain nameservers in a distributed computer system, comprising acts of:
  sending a namespace mapping resolution query to a plurality of network nodes from a monitoring computer system that monitors namespace mapping violations;
  waiting for one or more responses from at least one of the network nodes;
  determining whether a network node in the plurality of network nodes is a domain nameserver; and
  storing, in a storage device in the monitoring computer system, an indication that the network node is a domain nameserver in response to the act of determining, the indication of the network node being stored in a list of domain nameservers to be queried by the monitoring computer system to determine namespace mapping violations;
  determining a first mapping in a domain naming system, the act of determining the first mapping comprising an act of obtaining an authoritative mapping from an authoritative source of domain information in the domain naming system;
  determining a second mapping in the domain naming system, the act of determining a second mapping comprising acts of querying a domain nameserver of the list of nameservers to be queried and receiving a response from the domain nameserver, the response containing the second mapping, wherein the first mapping is a first namespace mapping that maps a first name to a first resource and the second mapping is a second namespace mapping that maps a second name to a second resource, and wherein the domain nameserver is a non-authoritative source for the second mapping in the domain naming system;
  comparing the first mapping to the second mapping and identifying at least one discrepancy between the first and second mapping; and
  generating and sending an alert message to a user, the alert message indicating the at least one discrepancy between the first and second mapping.

10. A method for discovering domain nameservers in a distributed computer system, comprising acts of:
  listening for a request from a non-authoritative domain nameserver to an authoritative domain nameserver;
  when the request is detected, adding the non-authoritative domain nameserver to a list of domain nameservers; and
  storing the list of domain nameservers in a memory of a monitoring computer system, the list of nameservers to be queried by the monitoring computer system to determine domain namespace mapping violations;
  determining a first mapping in a domain naming system, the act of determining the first mapping comprising an act of obtaining an authoritative mapping from an authoritative source of domain information in the domain naming system;
  determining a second mapping in the domain naming system, the act of determining a second mapping comprising acts of querying a domain nameserver of the list of nameservers to be queried and receiving a response from the domain nameserver, the response containing the second mapping, wherein the first mapping is a first namespace mapping that maps a first name to a first resource and the second mapping is a second namespace mapping that maps a second name to a second resource, and wherein the domain nameserver is a non-authoritative source for the second mapping in the domain naming system;
  comparing the first mapping to the second mapping and identifying at least one discrepancy between the first and second mapping; and generating and sending an alert message to a user, the alert message indicating the at least one discrepancy between the first and second mapping.

11. The method of claim 10, wherein the request is a resolve request.

12. A distributed computer system for locating discrepancies in domain name databases of a domain naming system, the distributed computer system comprising:
- a detector adapted to determine a first mapping and a second mapping, wherein the detector is further adapted to compare the first mapping to the second mapping and to identify at least one discrepancy between the first mapping and second mapping, wherein the detector is configured to obtain an authoritative mapping represented by the first mapping from an authoritative source of domain name information in the domain naming system and store the authoritative mapping in a database;
- a discoverer adapted to discover at least one domain nameserver among a plurality of network nodes;
- a database configured to store the first mapping and the second mapping and a list of a plurality of discovered domain nameservers, including the at least one nameserver that stores non-authoritative mapping information including the second mapping for the domain naming system, wherein the detector is configured to query the at least one domain nameserver, and store the second mapping contained within a response received from the at least one domain nameserver, wherein the discoverer is adapted to send a namespace mapping resolution query to a plurality of network nodes, wait for one or more responses from the plurality of network nodes, determine whether a network node in the plurality of network nodes is a domain nameserver based on a format of one or more responses received from the network node, and if the network node is a domain nameserver, storing the network node to the list of domain nameservers to be queried; and
- a component adapted to generate an alert message and send the alert message to a user, the alert message indicating the at least one discrepancy between the first mapping and the second mapping.

\* \* \* \* \*